United States Patent

[11] 3,624,430

[72] Inventors Yoshihiko Mizushima
Takagi;
Ochi Toru, Osamu; Masahiro Seki, Tokyo,
all of Japan
[21] Appl. No. 73,431
[22] Filed Sept. 18, 1970
[45] Patented Nov. 30, 1971
[73] Assignee Nippon Telegraph and Telephone Public Corporation
Tokyo, Japan
[32] Priority Sept. 22, 1969
[33] Japan
[31] 44/74690

[54] SELENIUM-TELLURIUM TRANSDUCER EMPLOYING PIEZORESISTANCE EFFECT
2 Claims, 8 Drawing Figs.

[52] U.S. Cl. 310/9.5, 252/62.9
[51] Int. Cl. H01v 7/00
[50] Field of Search 310/9.5, 8–8.3, 9.7, 9.8; 252/62.9, 62.3

[56] References Cited

UNITED STATES PATENTS

| | | | |
|---|---|---|---|
| 3,486,046 | 12/1969 | Zalar | 310/8 |
| 2,912,353 | 11/1959 | Dobrowolski et al. | 252/62.3 |
| 3,547,596 | 12/1970 | Kolb | 252/62.9 |
| 2,974,203 | 3/1961 | Flaschen et al. | 310/8 X |

*Primary Examiner*—D. F. Duggan
*Assistant Examiner*—B. A. Reynolds
*Attorney*—Burgess, Ryan & Hicks

ABSTRACT: The piezoresistance coefficient of a Se-Te alloy is 50–60 times those of germanium and silicon and a few times higher than those of selenium and tellurium. The invention provides a mechanoelectric transducer employing the piezoresistance effect of a vacuum deposited Se-Te alloy film.

INVENTOR

BY

ATTORNEY

*INVENTOR*

*BY*

*ATTORNEY*

SELENIUM-TELLURIUM TRANSDUCER EMPLOYING PIEZORESISTANCE EFFECT

BACKGROUND OF THE INVENTION

The present invention relates to a mechanoelectric transducer employing the piezoresistance effect of a semiconductor and more especially of a selenium-tellurium alloy.

A piezoelectric transducer has been known which employs a rock crystal, potassium sodium tartrate (Rochelle salt), barium titanate, etc. The application of a mechanical stress upon these piezoelectric crystals generates a voltage across the crystals. However, the piezoelectric crystals are insulating substances so that the current will not flow even though electromotive force is generated. Thus, the power sensitivity is low.

Furthermore, there is another disadvantage that the piezoelectric crystals must be single crystals—in polycrystalline substance electromotive force generated by the piezoelectric effect cancels with the opposing electromotive force, essentially, as a whole no piezoelectricity may be obtained.

There has been known a transducer which converts a stress into electricity utilizing the piezoresistance effect of semiconductors such as gerumanium, silicon, etc. The piezoresistance effect is the effect that the resistance of the semiconductors varies when a stress is applied to them. In the mechanoelectric transducer employing the piezoresistance effect, the resistance of the transducer varies corresponding to an applied stress, opposed to the piezoelectric transducer, consequently the current may be flown through the mechanoelectric transducer employing the piezoresistance effect. The transducer employing the piezoresistance effect has a high power sensitivity compared with the transducer employing the piezoelectric effect. Furthermore, the transducer employing the piezoresistance effect has an advantage that the substance may be a polycrystalline film which may be vacuum deposited. The semiconductors used in the transducer employing the piezoresistance effect is not required to undergo a special process of forming a PN-junction so that the manufacture is much facilitated. However, the piezoresistance coefficients of germanium, silicon, etc. employed in the mechanoelectric transducer employing the piezoresistance effect are low so that a sufficient stress must be applied to the transducer in order to obtain a sufficient variation in resistance.

It has been known that tellurium belonging to the group VIb of the periodic table has a high piezoresistance effect as compared with the germanium, silicon, etc. belonging to the group IVb. Recently, it is found that selenium belonging to the group VIb of the periodic table also has high piezoresistance effect. Both of selenium and tellurium belong to the trigonal system of crystallography and exhibit less variation in resistance to a stress applied to the direction of the crystalline $c$ axis, but greater variation to a stress applied to the perpendicular to the crystalline $c$ axis. The maximum piezoresistance coefficient of tellurium is about five times those of germanium, silicon, etc., while the maximum piezoresistance coefficient of selenium is about 15 times those of germanium, silicon, etc.

SUMMARY OF THE INVENTION

After extensive studies and experiments, it was found out that the piezoresistance coefficient of a selenium-tellurium alloy (Se-Te alloy) in the direction perpendicular to the crystalline $c$ axis is very high as compared with those of the simple substances of selenium and tellurium. For instance, the Se-Te alloy consisting of 70 atomic percent of selenium and 30 atomic percent of tellurium has the piezoresistance coefficient about six times that of selenium. When the atomic ratio of the Se-Te alloy is changed, that is the atomic percent of tellurium is increased from zero to 100 percent, the melting point, electric resistance and energy gap are all continuously increased or decreased gradually, but the piezoresistance coefficient has the maximum value at a certain atomic percent of tellurium.

It is therefore an object of the present invention to provide a mechanoelectric transducer with a higher power sensitivity employing the piezoresistance effect of a semiconductor of a Se-Te alloy.

In brief, the mechanoelectric transducer in accordance with the present invention comprises a Se-Te alloy vacuum-deposited upon the surface of an insulating base or substrate and gold electrodes deposited at the Se-Te alloy film. The current flows from one electrode to another through the Se-Te alloy film and when a stress is applied to the film, its resistance between the electrodes is varied greatly. It is therefore seen that when the mechanoelectric transducer in accordance with the present invention is applied for instance to a microphone, strain-gage, pickup, etc., the power sensitivity greatly higher than that of the transducers employing germanium, silicon, simple substances of selenium, tellurium, etc. may be attained.

The present invention will become more apparent from the following description of the preferred embodiments thereof taken in conjunction with the accompanying drawings.

BRIEF DESCRIPTION OF THE DRAWINGS

FIG. 2($b$) is a sectional view taken along the line A—A′ of FIG. 2($a$);

FIG. 4($b$) illustrates characteristic curve of melting point with respect to the atomic ratio of the Se-Te alloy of the present invention;

FIG. 4($c$) illustrates characteristic curve of electric resistance with respect to the atomic ratio of the Se-Te alloy of the present invention and FIG. 4($d$) illustrates characteristic curve of energy-gap with respect to the atomic ratio of the Se-Te alloy of the present invention.

DESCRIPTION OF THE PREFERRED EMBODIMENT

Figure 1:
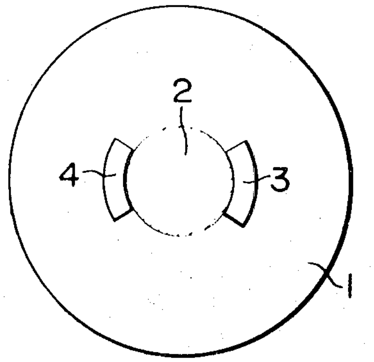
FIG. 1 is a top view of a mechanoelectric transducer in accordance with the present invention.

FIG. 1 is a top view of one embodiment of a mechanoelectric transducer in accordance with the present invention. A heat resistive thin high polymer film base 1 is 20 microns in thickness and about 3 centimeters in diameter and has Se-Te alloy vacuum-deposited upon central part of the surface of the base about one centimeter in diameter under vacuum less than $2 \times 10^{-5}$ Torr. Selenium and tellurium mixture with a predetermined mixing ratio is melted, agitated and mixed in an evacuated tube of hard glass and then quenched. The obtained mixture is then vacuum-deposited. The film of Se-Te alloy thus vacuum-deposited is designated by reference numeral 2. Gold is also vacuum-deposited at oppositing parts along the periphery of the Se-Te alloy film 2 to form electrodes 3 and 4, whose number may be increased more than three if required.

The embodiment of this invention showed that the Se-Te alloy film 2 consisting of 20 atomic percent of selenium and 80 atomic percent of tellurium and deposited about 2.5 microns in thickness had an electric resistance of about 1 kΩ between the electrodes 3 and 4, and that when the pressure of 1 g./cm.$^2$ was applied vertically to the surface of the base 1, the resistance between the electrodes 3 and 4 was increased by 12 percent. It was also found out that when the film 2 consisting of 70 atomic percent of selenium and 30 atomic percent of tellurium was deposited to the thickness of about 6 microns, the resistance between the electrodes 3 and 4 was about 250 kΩ when no pressure was applied and was increased by 45 percent when the pressure of 1 g./cm.$^2$ was applied vertically to the base 1.

The dimensions of the base 1 and the vacuum-deposited film 2 may be suitably varied as needs demand.

Figure 2A:
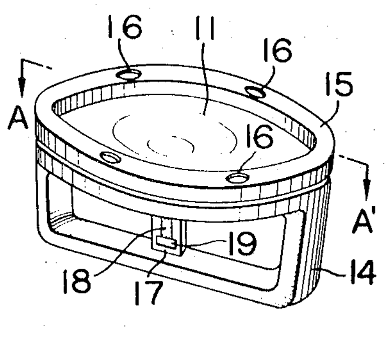
FIG. 2($a$) is a perspective view of a microphone incorporating the present invention.
Figure 2B:
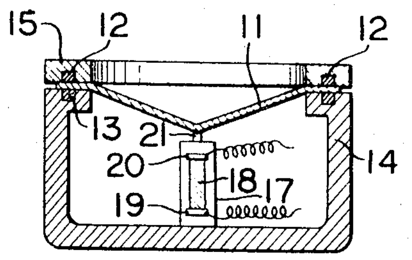
Figure 4A:
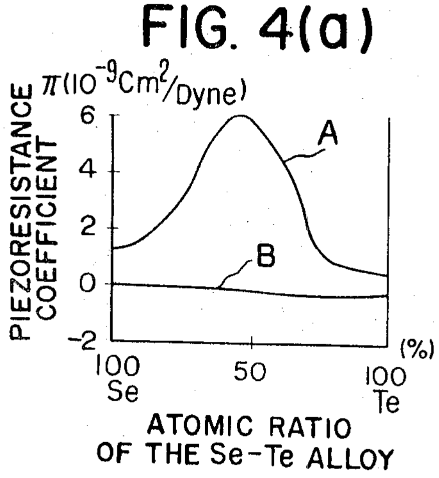
FIG. 4($a$) illustrates characteristic curves of piezoresistance coefficient with respect to the atomic ratio of the Se-Te alloy of the present invention.
Figure 4B:
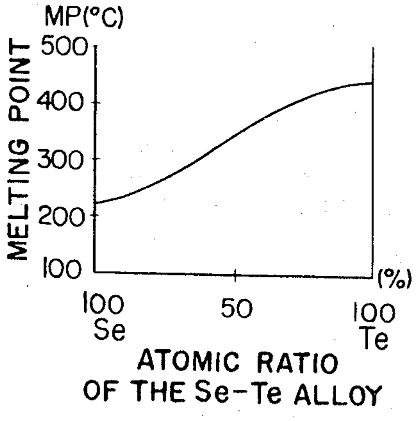
Figure 4C:
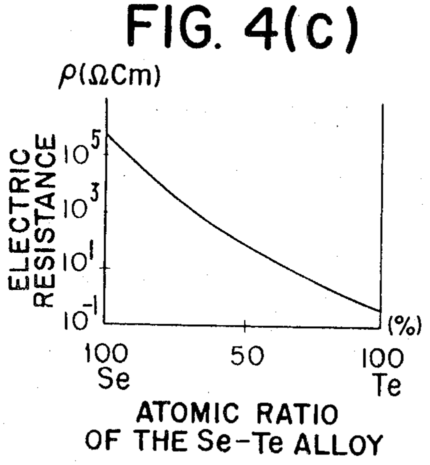
Figure 4D:
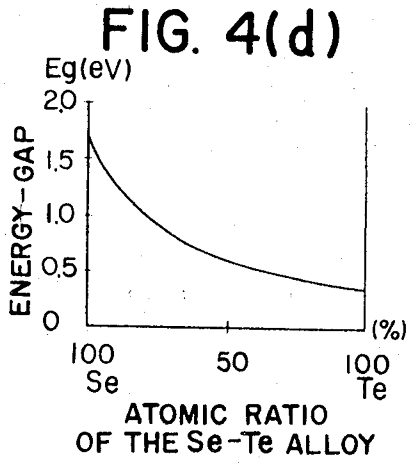

FIG. 2 illustrates a microphone incorporating the present invention, FIG. 2(*a*) being a perspective view while FIG. 2(*b*), a sectional view taken along the line A—A' of FIG. 2(*a*). A conical diaphragm 11 is securely fixed to a frame 14 through packings 12 and 13 by a ring 15 which in turn is secured to the frame 14 by setscrews 16. The diaphragm 11 may vibrate in the direction perpendicular to the base of the cone. A high polymer base 17 has a rectangular Se-Te alloy 18 vacuum-deposited thereupon with electrodes 19 and 20, thereby constituting a mechanoelectric transducer. The upper end of the base 17 is securely fixed to the vertex 21 of the diaphragm 11 while the lower end, to the center of the base of the frame 14. The motion of the diaphragm 11 is transmitted to the base or substrate 17 so that the resistance of the Se-Te alloy film 18 is varied accordingly. When the film 18 was of the type described with reference to FIG. 1, that is the film consisting of 20 atomic percent of selenium and 80 atomic percent of tellurium and when a voltage of 10 volts was applied across the electrodes 19, 20 through a load resistor of 600 ohms, the low frequency output of about 0.5 milliwatt was obtained across the load resistor.

Figure 3:
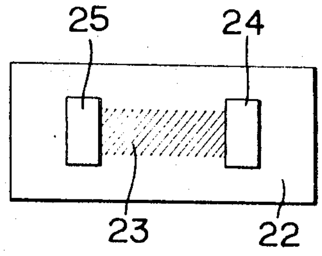
FIG. 3 is a top view of a strain-gage embodying the present invention.

FIG. 3 illustrates a strain-gage incorporating the present invention. A phenol aldehyde resin base or substrate 22 is for example 8 mm. in width, 20 mm. in length and 50 microns in thickness. A Se-Te alloy film 23 was deposited upon the central part of the surface of the base or substrate 22. For instance, the film 23 consists of 80 atomic percent of selenium and 20 atomic percent of tellurium and is 4 mm. in width, 8 mm. in length and about 10 microns in thickness. Gold electrodes 24 and 25 are deposited on both ends of the film 23. The experiment showed that when no stress was applied, the resistance between the electrodes 24 and 25 was 3 megohms, but when the stress was applied so that the base or substrate 22 was extended in the longitudinal direction, the resistance between the electrodes 24 and 25 increased in proportion to the elongation. For example, the resistance was increased by 16 percent when the base or substrate 22 was elongated by 10 microns.

The microphone and strain-gate described above with reference to FIGS. 2 and 3 are only a few examples of various applications of the present invention, and the present invention may be incorporated in various types of mechanoelectric pickups.

As is clear from the foregoing, the present invention has an object to provide a mechanoelectric transducer with a high electric power sensitivity employing a Se-Te alloy deposited film and its piezoresistance effect. FIG. 4 illustrates various characteristics such as piezoresistance coefficient, melting point, electric resistance and energy-gap with respect to the atomic ratio of the Se-Te alloy of the present invention. FIG. 4(*a*) shows the characteristic curve of the piezoresistance coefficient; FIG. 4(*b*), the characteristic curve of the melting point; FIG. 4(*c*), the characteristic curve of the electric resistance and FIG. 4(*d*), the characteristic curve of the energy gap.

In FIG. 4(*a*), the curve A is the characteristic curve of the piezoresistance coefficient of a Se-Te alloy crystal perpendicular to the crystalline *c* axis while the curve B, that in the direction of the crystalline *c* axis. In comparison with the characteristic curves illustrated in FIGS. 4(*b*), (*c*) and (*d*) which increase and decrease gradually from left to right, it is seen that the piezoresistance coefficient perpendicular to the crystalline *c* axis has the maximum value at a certain atomic ratio of the Se-Te alloy. This unique characteristics was revealed for the first time by the experiments conducted by the inventors.

The Table below shows some examples of piezoresistance coefficient $\pi$ of simple substances of Ge,Si,Se,Te. In table, n-Ge refers to "N-type Ge while p-Ge," P-type Ge.

| piezoresistance coefficient | $\pi$(cm.$^2$/dyne) | crystalline orientation |
|---|---|---|
| n-Ge | $9\times10^{-11}$ | 111 |
| p-Ge | 6 | 111 |
| p-Si | 7 | 111 |
| p-Se | 120 | 100 |
| p-Te | 40 | 100 |

From this table and FIG. 4(*a*), it is readily seen that the piezoresistance coefficient of the Se-Te alloy (Se: 70 atomic percent and Te: 30 atomic percent) perpendicular to the crystal crystalline *c* axis is about six times that of the simple substance of selenium. From FIG. 4(*c*), it is seen that the resistance is continuously reduced as the atomic percent of tellurium is increased so that a desired resistance of transducer may be obtained by vacuum-depositing a Se-Te alloy having a suitable composition.

What is claimed is:

1. A mechanoelectric transducer comprising an insulating film base or substrate, a vacuum deposited film substantially consisting of selenium-tellurium alloy upon said insulating film base or substrate, and electrodes disposed in contact with said vacuum deposited film at two or more than two positions, whereby the electrical signals corresponding to the stress applied to said vacuum deposited film may be derived employing piezoresistance effect of said film.

2. The mechanoelectric transducer as defined in claim 1 wherein the composition of said vacuum deposited film consists of 20–80 atomic percent of selenium and 80–20 atomic percent of tellurium.

* * * * *

UNITED STATES PATENT OFFICE
CERTIFICATE OF CORRECTION

Patent No. 3,624,430 Dated November 30, 1971

Inventor(s) Yoshihiko Mizushima, et al.

It is certified that error appears in the above-identified patent and that said Letters Patent are hereby corrected as shown below:

| | |
|---|---|
| Names of second and third inventors to read: | Toru Takagi<br>Osamu Ochi |
| Column 4, line 29, | number "100" to be aligned in column. |

Signed and sealed this 13th day of June 1972.

(SEAL)
Attest:

EDWARD M.FLETCHER,JR.
Attesting Officer

ROBERT GOTTSCHALK
Commissioner of Patents